No. 769,304. PATENTED SEPT. 6, 1904.
W. B. CHURCHER.
TELEPHONE.
APPLICATION FILED APR. 26, 1900.
NO MODEL. 3 SHEETS—SHEET 2.
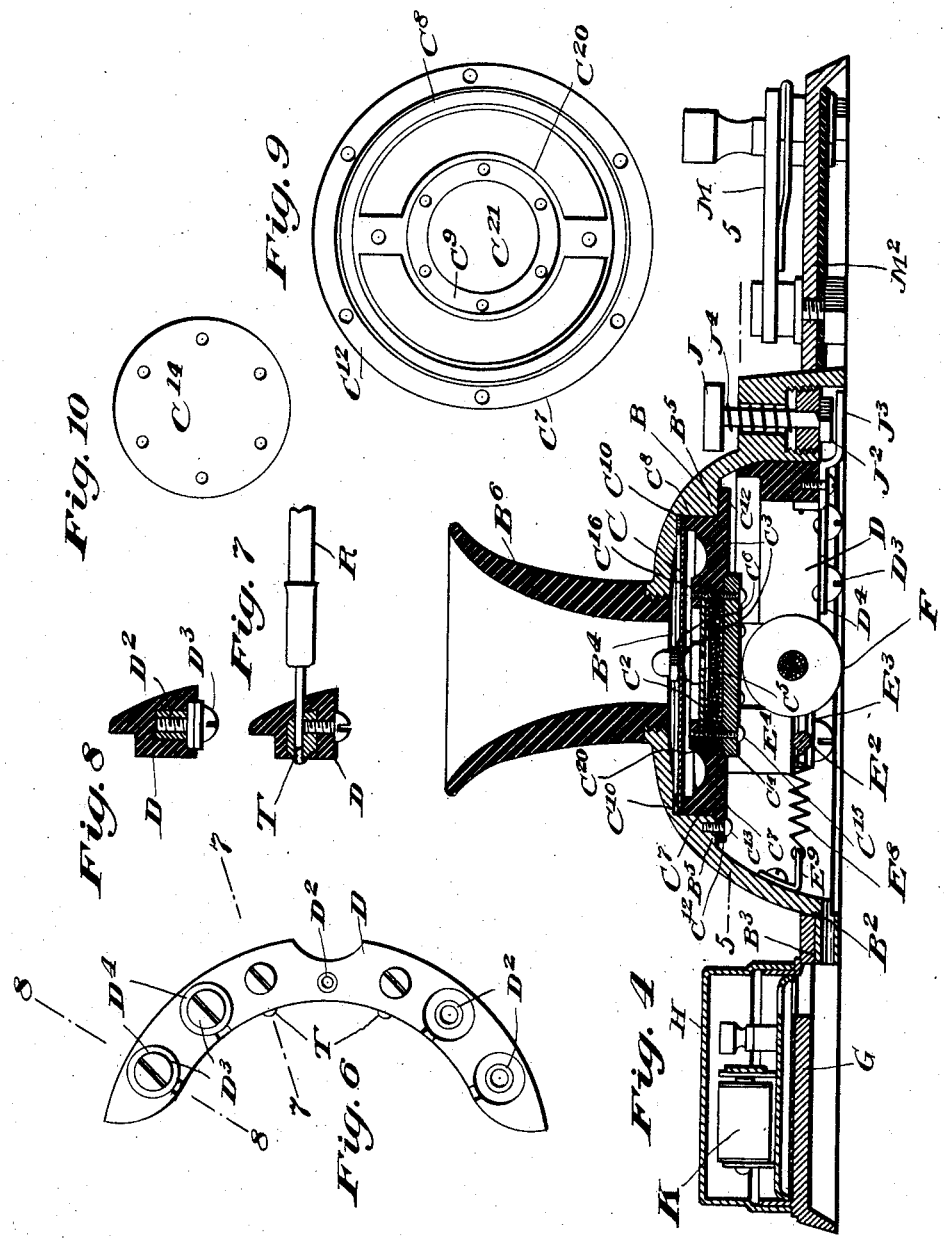
Witnesses
Samuel A. West
K. Smith.
Inventor
Wm. B. Churcher
per Wm. Hubbell Fisher,
Attorney.

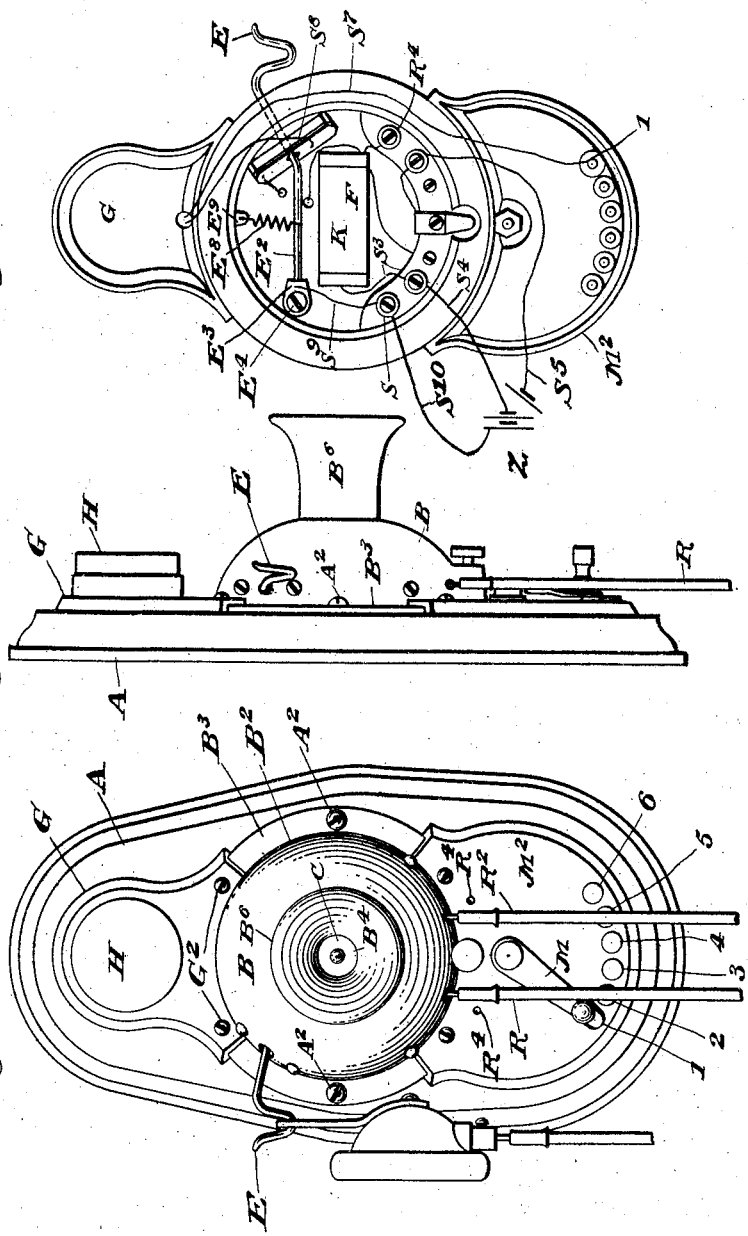

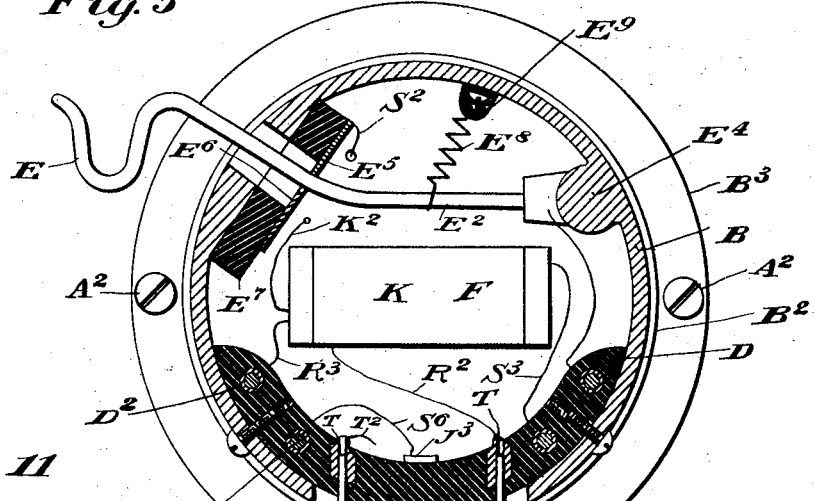
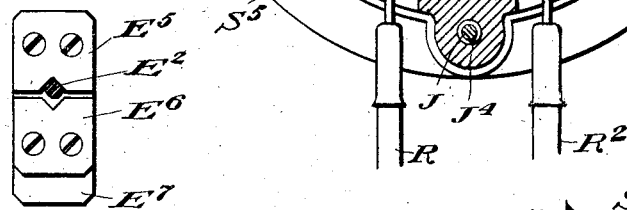
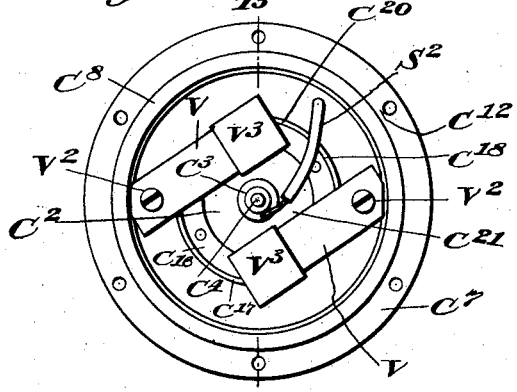
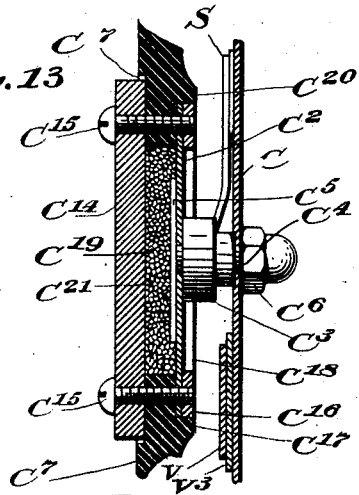

No. 769,304. Patented September 6, 1904.

UNITED STATES PATENT OFFICE.

WILLIAM B. CHURCHER, OF CINCINNATI, OHIO, ASSIGNOR OF ONE-HALF TO ALBERT F. MAISH, OF CINCINNATI, OHIO.

TELEPHONE.

SPECIFICATION forming part of Letters Patent No. 769,304, dated September 6, 1904.

Application filed April 26, 1900. Serial No. 14,472. (No model.)

*To all whom it may concern:*

Be it known that I, WILLIAM B. CHURCHER, a citizen of the United States, and a resident of the city of Cincinnati, in the county of Hamilton and State of Ohio, have invented certain new and useful Improvements in Telephones, of which the following is a specification.

Some of the principal objects of my invention are the attainment of great compactness of parts, of a capacity for their ready and simple attachment or separation, and a simplicity of construction wherein by ingenious conformation and combination one piece takes the place of what has hitherto been composed of a number of parts.

The several features of my invention and the various advantages resulting from their use conjointly or otherwise will be apparent from the following description and claims.

In the accompanying drawings, making a part of this application, and in which similar letters of reference indicate corresponding parts, Figure 1, Sheet 1, represents a front elevation of a telephonic structure illustrating my invention. Fig. 2, Sheet 1, represents a side (edge) elevation of the structure shown in Fig. 1. Fig. 3, Sheet 1, is a view looking at the rear of the same structure, the back-support having been removed. Fig. 4, Sheet 2, is an enlarged vertical section taken centrally through the instrument. Fig. 5, Sheet 3, represents a sectional elevation taken on the line 5 5 of Fig. 4 and showing that face of the section which faces toward the front in Fig. 4, this Fig. 5 being on the same scale as Fig. 4. Fig. 6 is an elevation showing the semicircular insulating-block carried in the casing and holding the binding-screws for the circuit arrangement. Fig. 7 is a section taken transversely through the block shown in Fig. 6 in the plane indicated by the line 7 7 of Fig. 6. Fig. 8 is a similar section taken through said block in the plane indicated by line 8 8 of Fig. 6. Fig. 9 is a view showing the recessed face of the insulating-disk which forms the back of the transmitter. Fig. 10 is a view showing the carbon disk at the rear face of said insulating-disk. Fig. 11 is a fragmentary view showing the arrangement of the circuit-contacts operating in connection with the support-hook for the receiver. Fig. 12 is a view showing the outer face of the transmitter, the outer diaphragm being omitted. Fig. 13 is an enlarged fragmentary sectional view taken through the transmitter in the plane indicated by the line 13 13 of Fig. 12.

The basal support A of the instrument may be of any suitable material and consists of a part of another structure—that is, of a part of a building, &c.—but it is preferably made of a single piece independent of the supporting structure. It can then be suitably connected to one of the latter. Wood is a preferred material out of which to make it.

B indicates the transmitter-shell, somewhat hemispherical in form and provided at its peripheral edge $B^2$ with a flange $B^3$, especially provided for its ready combination with the base G of the signal or call instrument H or with the switchboard $M^2$ and switch M or with both the signal device and the switch, as required. This flange $B^3$ affords a convenient means whereby the transmitter is connected to the basal support A, such connection being effected by means of two screws $A^2 A^2$. The transmitter has a central opening $B^4$, enabling the voice of the speaker to communicate with the diaphragm C. The latter, in the present illustrative instance, is composed of a thin disk of aluminium connected to a smaller disk $C^2$, of mica, the two disks being concentric and centrally held apart by a ring $C^3$ and held together by a rod $C^4$, provided at its inner end with a discal flange $C^5$, (next to the mica,) the rod passing through the mica $C^2$ and ring $C^3$ and the disk C and receiving on its free end a nut $C^6$, screwed onto it, thereby clamping together the disks and their intervening ring.

I provide an annular supporting-piece $C^7$, devised as hereinafter specified. This piece I make in one and of an insulating material, as electrose or vulcanized rubber, &c. This piece $C^7$ has an outer raised annular edge or flange $C^8$ and a lower raised annular shoulder $C^{20}$ of less diameter than the outer flange $C^8$. This annular piece $C^7$, as its name implies, has a central opening $C^{21}$. On the annular flange $C^8$ is rested the aluminium diaphragm, the outer edge being in contact with the flange. The outer edge portion of the mica disk $C^2$ is in contact with the annular piece $C^7$ and is supported by the latter. Special attachment to hold the disk C in position on the flange $C^8$ of the piece $C^7$ is unnecessary, because the disk C, with the flange $C^8$, is caused to fit into an annular recess $C^{10}$ in the transmitter-shell B. It is to be understood that this disk C is insulated from the shell B, first, by an insulating-ring which is between the front of the rim of disk C and the shell B; secondly, by the flange of the insulating-piece $C^8$, which duly separates the edge of the disk C from the shell B. A flange $C^{12}$, extending radially from the rearward portion of the annular piece $C^7$, rests upon a shoulder $B^5$ of the shell B and is firmly fixed thereto by screws $C^{13}$. A carbon disk $C^{14}$ is secured at the rear of piece $C^7$ to the latter by screws $C^{15}$ and closes the rear part of opening $C^{21}$. There is a ring $C^{16}$, located behind the diaphragm C, abutting a flat edge $C^{17}$ of the recess $C^{18}$. Screws $C^{15}$ pass through the carbon back $C^{14}$ and through the annular piece $C^7$, through mica disk $C^2$, and are threaded into the ring $C^{16}$, thus clamping these four parts together. As shown, the carbon disk is preferably set into an annular recess $C^{19}$ in the bottom portion of the piece $C^7$.

The opening $C^{21}$ is converted by the mica disk, constituting a wall in front, and the carbon disk $C^{14}$, constituting the wall at the rear, into a chamber, which latter is filled with comminuted carbon. An excellent transmitter is formed by the aforementioned construction, and the interconstruction of the diaphragm and the shell is very simple and convenient and enables the parts to be connected or disengaged with great ease and rapidity.

For the purpose of improving the articulation I employ certain well-known means—to wit, on each side I locate a spring V, secured to the transmitter-shell by a screw $V^2$. The opposite or free end of each spring V is provided with a piece of felt or rubber or the like, which intervenes between the spring and the diaphragm, and thus controls the vibrations of the diaphragm in a well-known manner, so as to enable the diaphragm to better produce vibrations of articulate sounds. Within the shell B and father rearward I locate a piece D approximately semicircular and serving as a support and holder for the electrical contacts and for certain other parts hereinafter mentioned. This piece is formed of an insulating material and is preferably cast of electrose or vulcanized rubber. In this piece D are located four metal screw-bushings $D^2$, each adapted to receive a contact-screw $D^3$. On the screw directly beneath the head of the screw $D^3$ is a washer $D^4$, for the purpose of holding the leading-in circuit-wires in place. The hook E for carrying the receiver has its shank $E^2$ pivoted at $E^3$ to a stud $E^4$ of the transmitter-shell B; but the hook and its shank are insulated from the shell B. The shank of the hook is arranged to oscillate between two contacts $E^5$ $E^6$. When the receiver is hung on this hook, the circuit is broken and the transmitter is cut out of circuit and the shank $E^2$ of the receiver is in contact with the contact $E^6$. When the receiver is removed from the hook, the latter rises, and its shank $E^2$ makes contact with contact $E^5$, to enable the operator to transmit messages. These contacts $E^5$ $E^6$ are duly insulated from the shell. For example, $E^7$ indicates an insulating-piece on the shell, to which the contacts are affixed. A spring $E^8$, insulated from the shell B by the insulating-piece $E^9$ and strained between the hook-shank and the piece $E^9$, draws up the hook when the receiver is withdrawn from it and automatically brings the hook-shank $E^2$ against the contact $E^5$. Within the shell and directly behind the carbon piece $C^{14}$ of the receiver is an induction-coil F, the use of which is well known to those versed in the art of telephony.

A push-button J, having a contact $J^2$, is adapted to make contact with the contact $J^3$. A spring $J^4$ beneath the push-button keeps it raised off its contact except when intentionally depressed by human agency.

It will be understood that the movement of the receiver-hook closes the transmitter and bell circuits alternately in the usual manner, the suitable connections with the line being made through the binding-posts on the piece D and the switch M. The push-button J is adapted to complete the calling-circuit in the ordinary manner.

By securing the flange of the transmitter-shell to a suitable support the bell shell or plate and the switch-plate are also duly supported, for it will be borne in mind that to the flange of the transmitter-shell are connected on one side the edge of the switch-plate and on the other side the edge portion of the bell plate or shell.

The preferred mode of securing the transmitter-shell to the suitable support is by two screws $A^2$ $A^2$, one on each side of the shell and passed through the flange of the shell and engaging the support. Thus the entire set, consisting of transmitter-shell and the portion of the telephone it contains and the switch-plate and switch and buttons and the bell plate or shell and bell, can be attached to the support or removed therefrom very quickly. So, also, can the bell support or shell G be removed from the transmitter-shell or reattached by means of one or two screws $G^2$, and by similar means the bell-plate, with bell, can be separated from the transmitter-shell or resecured thereto. This construction enables me to use the transmitter portion either alone or with either the bell or switch portions, or both, as found desirable.

In addition to the advantages heretofore mentioned arising from my invention and those which are obvious without special mention it is to be noted that the several parts have great durability, also that the main supporting division parts are of metal and wholly indestructible and that these are also capable of a high finish, rendering them very attractive in appearance. When it is desired, they may be nickel-plated.

The receiver-cords R and R² may when desired pass from the part D down and along back of the switch-plate and then duly connect with the receiver.

What I claim as new and of my invention, and desire to secure by Letters Patent, is—

1. In a telephone, a transmitter-shell having an outer flange, a switch-plate connected directly to said flange, and a bell plate or shell also connected directly to said flange, substantially as described.

2. In a telephone, a transmitter-shell having an outer flange, and a switch-plate having a flange overlapping said first-named flange and secured thereto, substantially as described.

3. In a telephone, a transmitter-shell having an outer flange, and a bell plate or shell having a flange overlapping said first-named flange and secured thereto, substantially as described.

4. In a telephone, a transmitter-shell having a circular flange, and a bell plate or shell having a curved rabbeted edge overlapping said circular flange and secured thereto, substantially as described.

5. In a telephone, a transmitter-shell having a circular edge flange, a plate or shell at one side thereof carrying the switch and its buttons and having a rabbeted and curved edge overlapping said flange and secured thereto, a plate or shell on the opposite side carrying the bell and having likewise a rabbeted and curved edge secured to said flange substantially as described.

6. In a telephone, a transmitter-shell having a circular edge flange, a plate or shell at one side thereof carrying the switch and its buttons and having a rabbeted and curved edge overlapping said flange and secured thereto, a plate or shell on the opposite side carrying the bell and having likewise a rabbeted and curved edge secured to said flange, a support, and means for securing said flange to said support, substantially as described.

7. In a telephone, a transmitter-shell of substantially semispherical shape and having an annular groove, and an annular shoulder in rear thereof and below the plane of the groove, a diaphragm having its edge seated in said groove, a supporting-piece $C^7$ having its edge seated in said groove and holding said diaphragm in position, means for securing said piece $C^7$ to the said shoulder and a microphone carried by said piece $C^7$, substantially as described.

WILLIAM B. CHURCHER.

Attest:
SAMUEL A. WEST,
K. SMITH.